US005215478A

United States Patent [19]

Briones

[11] Patent Number: 5,215,478

[45] Date of Patent: Jun. 1, 1993

[54] SPARK GAP DEVICE

[75] Inventor: Francisco R. Briones, Markham, Canada

[73] Assignee: Amphenol Corporation, Wallingford, Conn.

[21] Appl. No.: 890,261

[22] Filed: May 29, 1992

[51] Int. Cl.[5] ............ H02H 3/22

[52] U.S. Cl. ............ 439/620; 361/119; 361/120

[58] Field of Search ............ 361/119, 120; 439/620

[56] References Cited

U.S. PATENT DOCUMENTS

| | | | |
|---|---|---|---|
| 2,454,448 | 11/1948 | Hasselhorn et al. | 175/30 |
| 3,087,093 | 4/1963 | Bourgerie | 317/12 |
| 3,271,619 | 9/1966 | Lafferty | 315/111 |
| 3,316,467 | 4/1967 | Sperry | 317/256 |
| 3,324,335 | 6/1967 | Simko | 313/244 |
| 3,484,842 | 12/1969 | Cole | 29/25.42 |
| 3,564,682 | 2/1971 | Carroll, Jr. et al. | 29/25.17 |
| 3,668,458 | 6/1972 | Irie et al. | 313/325 |
| 3,791,711 | 2/1974 | Jonassen | 316/20 |
| 4,293,887 | 10/1981 | Splitt et al. | 360/120 |
| 4,318,149 | 3/1982 | Murakawa et al. | 361/15 |
| 4,500,159 | 2/1985 | Briones et al. | 439/620 |
| 4,509,090 | 4/1985 | Kawanami et al. | 361/119 |
| 4,544,984 | 10/1985 | Kawanami et al. | 361/119 |
| 4,626,957 | 12/1986 | Kaneko et al. | 361/275 |
| 4,633,359 | 12/1986 | Mickelson et al. | 361/119 |
| 4,884,982 | 12/1989 | Fleming et al. | 439/620 |
| 4,905,931 | 3/1990 | Covey | 244/1 A |
| 4,934,960 | 6/1990 | Capp et al. | 439/620 |
| 5,145,412 | 9/1992 | Tan et al. | 439/620 |
| 5,151,054 | 9/1992 | Briones et al. | 439/620 |
| 5,167,536 | 12/1992 | Wang | 439/620 |

OTHER PUBLICATIONS

Amphenol 456 Series, "Capacitively Decoupled BNC," Issue Jan. 1991.

*Primary Examiner*—Gary F. Paumen
*Attorney, Agent, or Firm*—Bacon & Thomas

[57] ABSTRACT

A spark gap device includes a conductive main body and an integral conductive flange, but no gap. The gap is formed by installing the device such that the flange positions an end of the main body relative to a conductor which forms a part of or is connected to an electrical contact in an electrical filter connector to form a desired gap between the body and the conductor. The spark gap device thus installed is especially suitable for use in miniature filter connectors of the type in which the filters are capacitor chips positioned in recesses of the connector housing between an electrical contact and a ground clip, the spark gap device replacing a capacitor chip in one of the recesses.

13 Claims, 1 Drawing Sheet

SPARK GAP DEVICE

BACKGROUND OF THE INVENTION

1. Field of the Invention

This invention relates to a spark gap device for use in an electrical filter connector.

2. Description of Related Art

In many electrical connector applications, it is essential that transient voltages be prevented from reaching electronic components within the electrical device to which the connector is connected. This is especially true in cases where the connector is used to connect a cable to the electrical device, and where there is a significant possibility that transients can arise within the cable, such as might occur in a local area network (LAN). As a result, numerous proposals have been implemented for placing filters within the connectors themselves, in order to prevent undesired voltages that arise outside of the electrical device from entering the device.

A common connector filtering scheme, first disclosed in U.S. Pat. No. 4,500,159, and also shown in U.S. Pat. No. 4,934,960, is to use relatively inexpensive miniature capacitor chips inserted into recesses in a dielectric connector body or housing, one electrode of the chips contacting an electrical signal contact in the connector, and the other being grounded via a metal clip fitted onto the connector body. However, the resulting miniature capacitive filters have a limited voltage handling capacity.

In a variation of the chip capacitor filtering scheme, the chip capacitors are connected between the outer contact of a BNC connector and panel to which the connector is attached, thereby decoupling the panel ground from the cable ground, except with respect to AC transients. As is the case with filtering capacitors, however, the decoupling chip capacitors are vulnerable to high voltage transients. Examples of this type of connector include the BNC connector shown in the Amphenol sales brochure entitled "Capacitively Decoupled BNC", Issue January 1991, and also the connector disclosed in U.S. Pat. No. 4,884,982.

Other examples of chip capacitor filtering or decoupling arrangements are also shown in U.S. Pat. No. 5,151,054 issued Sep. 29, 1992 and in U.S. Pat. Nos. 2,454,448, 3,324,335, 3,791,711, 4,293,887, 4,509,090, and 4,905,931.

One solution to the problem of low voltage handling capacity in chip capacitors is to use spark gap devices for shunting high voltage transients to ground, the conventional spark gap devices including a non-conductive gap in a conductive path capable of handling the abnormally large voltages that might, for example, be induced by a lightening strike. However, the cost of manufacturing conventional spark gap devices small enough to fit within the size requirements of a typical miniature connector is prohibitive, and the use of spark gaps in miniature filter or BNC connectors for the purpose of providing protection against larger voltages has therefore proved impractical.

Examples of discrete spark gap devices, or capacitor/spark gap combinations, are disclosed in U.S. Pat. Nos. 3,087,093, 3,271,619, 3,316,467, 3,484,842, 3,564,682, 3,668,458, 4,318,149, and 4,626,957. None of these devices is suitable for use in a capacitor chip type filter or BNC connector.

An example of a spark gap device which is described as being suitable for use in a BNC type connector is shown in the above-mentioned U.S. Pat. No. 4,884,982. However, use of this device requires modification of the conventional decoupled BNC housing and ground clip, and also the use of a separate dielectric in order to obtain the most accurate gap dimensions, all of which present problems in terms of both cost and efficiency.

SUMMARY OF THE INVENTION

It is accordingly an objective of the invention to provide an inexpensive and yet efficient spark gap device suitable for use in an electrical connector.

It is a further objective of the invention to provide an electrical connector which includes both at least one chip capacitor for coupling an electrical contact to a chassis ground or panel and at least one spark gap device for protection against voltages too large to be handled by the conventional filters.

It is a still further objective of the invention to provide an electrical connector of the type utilizing chip capacitors inserted into recesses in a dielectric connector body, one electrode of each capacitor being connected to an electrical contact contained in the dielectric body and the other electrode of each capacitor being connected to ground via a ground clip fitted on the dielectric body, the filter connector including at least one spark gap device inserted into one of the recesses.

These objectives are achieved, in accordance with the principles of a preferred embodiment of the invention, by providing a spark gap device in the form of a conductive main body having a length which is less than a length of a recess in a plastic connector dielectric housing, the recess extending between a conductor or contact to be protected and a ground clip, the length of the desired spark gap plus the length of the spark gap device main body being equal to the length of the recess in a direction parallel to an axis of the recess which extends from the contact to the ground clip.

The objectives of the invention are furthered by providing at one end of the conductive main body a flange which engages an exterior surface of the connector housing in order to position the other end of the conductive main body relative to the contact or conductor to be protected. Preferably, the main body and flange are formed as an integral unit, the flange serving as a contact for the ground clip.

The objectives of the invention are also achieved by providing an electrical connector which includes such a spark gap device consisting exclusively of a conductive main body and flange as described above, and in particular by providing a miniature electrical connector which includes such a spark gap device, the flange of which engages a ground clip, and the main body of which is positioned in a recess of the plastic connector housing, the connector also being provided with at least one chip capacitor positioned in a second recess similar to the recess in which the spark gap device is positioned and having one electrode in engagement with the contact and one electrode in engagement with the ground clip.

More generally, therefore, the invention provides a spark gap device for an electrical connector which consists exclusively of a conductive main body and integral flange, and which does not include its own gap, and an electrical connector which includes such a single-member spark gap device, as will become more apparent from the following detailed description of a preferred embodiment of the invention.

DETAILED DESCRIPTION OF THE PREFERRED EMBODIMENT

Figure 1:
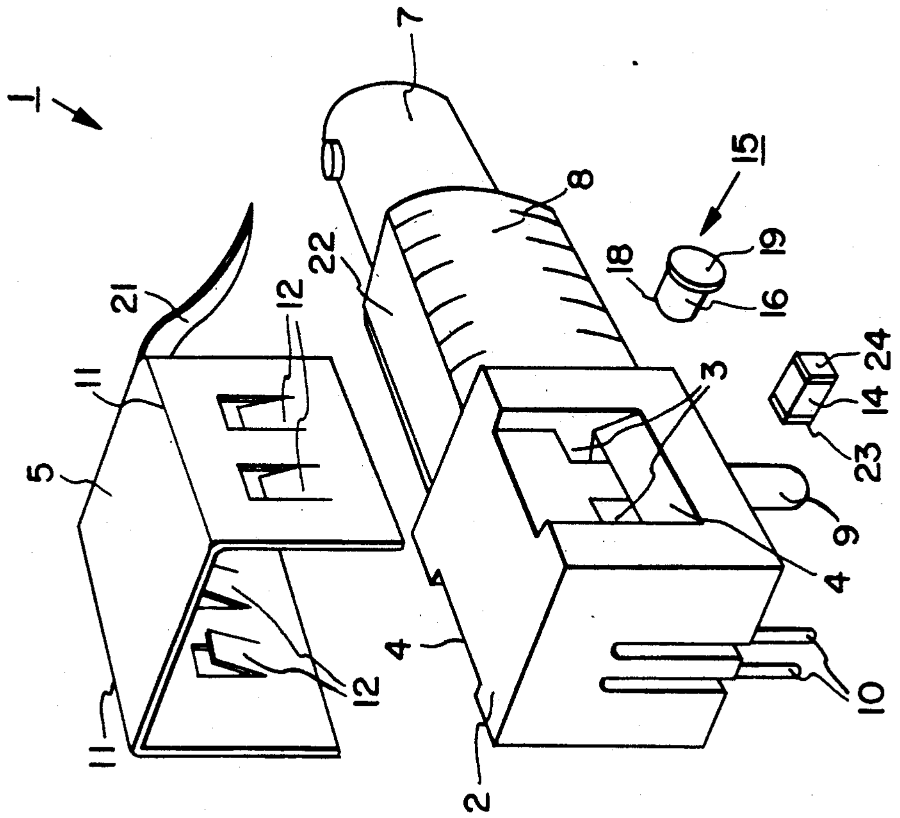
FIG. 1 is a perspective view of a miniature electrical connector and a spark gap device constructed in accordance with the principles of a preferred embodiment of the invention.
Figure 2:
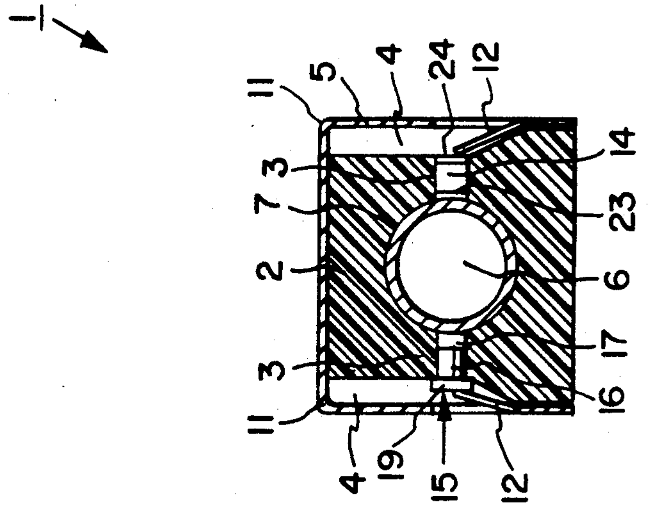
FIG. 2 is a cross-sectional end view of the miniature electrical connector of FIG. 1, including an installed chip capacitor filter and the preferred spark gap device.

As shown in FIGS. 1 and 2, a BNC type connector 1 includes a dielectric body or housing 2, made for example of plastic. Housing 2 includes four recesses 3 which communicate with two larger recesses 4 on the exterior of the main body and which are provided for the purpose of accommodating portions of a ground clip 5 mounted on the housing. Recesses 3 also communicate with a central opening 6 for receiving an electrical contact 7. Contact 7 is connected during use to the outer contact of a mating coupler (not shown), which in turn is connected to a coaxial cable shield, and thus is at ground potential. An inner contact (not shown) carries the information signals, as is well-known.

In the illustrated embodiment, a threaded coupling member 8 extending from housing 2 is provided to secure the mating coupler to connector 1. In addition, pins 9 and 10 are included for the purpose of mounting the connector on a circuit board (not shown), the circuit board including traces to which the inner contact (not shown) and outer contact 7 are electrically connected in conventional fashion.

Ground clip 5 is in the form of an electrically conductive metal plate spring bent at corners 11 to fit over the dielectric body or housing 2. Ground clip 5 includes a tongue 21 for establishing a ground path to a panel and four resilient tines 12 which extend into recesses 4 to contact and establish an electrical connection with ground electrodes 13 of chip capacitors 14. Chip capacitors 14 are inserted into respective exterior openings of recesses 3 such that a first electrode 23 of each inserted capacitor contacts and establishes an electrical connection with the electrical contact 7 within opening 6, while the second electrode 24 extends to near the exterior opening to engage a tine 12 extending from clip 5 to thereby form a capacitive coupling between the outer contact and the clip. In the illustrated embodiment of the invention, a chip capacitor 14 is placed in at least one of the four recesses.

Also provided in at least one of the four recesses is a spark gap device 15. Spark gap device 15 includes a conductive main body 16, formed for example from die cast metal and depicted as a cylinder having a radius which is approximately equal to but smaller than a width of one of the recesses 3 to fit within the recess. Spark gap device 15 also includes means for axially positioning the main body in the recess to form a spark gap 17 between electrical contact 7 and one end 18 of the main body 16. The axial positioning means consists of, in this embodiment, a flange 19 integrally cast with the main body 16 having a width greater than the width of a recess 3 to prevent the main body 16 from being inserted into the recess beyond a predetermined point.

In the case of a typical industry standard "block" type BNC connector as illustrated, a suitable gap size would be approximately 0.004", although the gap size can be customized as desired by forming main body 16 to have an appropriate length in the direction of an axis extending from the inside, housing engaging surface of flange 19 to end 18 of main body 16. In order to form the spark gap, therefore, the axial length of main body 16, from end 18 to flange 19, plus the length of spark gap 17, should be exactly equal to the distance from the outside opening of recess 3 to contact 7.

Having thus described a preferred and especially advantageous embodiment of the inventive spark gap device and a an electrical connector including same, it will nevertheless be appreciate by those skilled in the art that numerous variations of the above-described connector and spark gap device are possible.

First of all, it should be appreciated that the above spark gap device does not require a spark gap to be formed in the device itself, and that the spark gap is instead provided by positioning the device relative to the conductor which is to be protected by the device. Thus, the inventive spark gap device requires at least a conductive main body and axial positioning means. Other than these requirements, however, those skilled in the art are free to design variations of the inventive device, including variations in the shape of the main body and in the form of the positioning means.

Furthermore, the depicted form of the connector itself is meant to be illustrative in nature, and not in any way limiting. The inventive spark gap device may be used in a wide variety of capacitively decoupled BNC connectors, filter connectors, and other electrical devices, including but not limited to, multi-pin electrical connectors, both filtered and not filtered, elecrical connectors having filters other than chip capacitors, miniature transient suppression connectors, and so forth.

Finally, it will be appreciated by those in the art that the inventive spark gap device may be used in place not only of filters having one electrode which directly engages the connector contact, but also in filter connectors of the type in which the filter engages a separate conductive contact member electrically connected to the contact. Therefore, it is intended that the invention not be limited by the above description except to the extent required by the prior art, and that the invention be limited only by the appended claims given their broadest possible interpretation in light of the prior art.

I claim:

1. An electrical connector, comprising:

a dielectric housing having an opening and at least one recess in communication between the opening and an exterior of said housing;

an electrically conductive contact in said opening;

a spark gap device including a conductive main body and main body positioning means for positioning an end of said body in said recess a predetermined distance from said electrical contact to thereby form a spark gap between said end of said body and the contact, the spark gap extending the entire distance between said end of said body and the contact;

grounding means for electrically connecting said spark gap device to ground.

2. An electrical connector as claimed in claim 1, wherein said housing includes a plurality of said recesses, and at least one of said recesses includes therein an electrical component having one electrode electrically connected to said contact member and a second electrode electrically connected to said grounding means.

3. An electrical connector as claimed in claim 2, wherein said component is a capacitor chip.

4. An electrical connector as claimed in claim 3, wherein said grounding means includes a resilient metal ground clip positioned on an exterior surface of said dielectric body to contact said second electrode and said positioning means.

5. An electrical connector as claimed in claim 4, wherein said ground clip includes at least two resilient tines, respectively in engagement with said second electrode and said positioning means.

6. An electrical connector as claimed in claim 5; wherein said positioning means is a conductive flange integral with said main body and having a width which is greater than a width of said main body measured in a direction perpendicular to an axis connecting said flange and said end of said main body.

7. An electrical connector as claimed in claim 2, wherein said grounding means includes a resilient metal ground clip positioned on an exterior surface of said dielectric body to contact said second electrode and said positioning means.

8. An electrical connector as claimed in claim 7, wherein said ground clip includes at least two resilient times, respectively in engagement with said second electrode and said positioning means.

9. An electrical connector as claimed in claim 8, wherein said positioning means is a conductive flange integral with said main body and having a width which is greater than a width of said main body measured in a direction perpendicular to an axis connecting said flange and said end of said main body.

10. An electrical connector as claimed in claim 1, wherein said grounding means includes a resilient metal ground clip positioned on an exterior surface of said housing to contact said positioning means.

11. An electrical connector as claimed in claim 10, wherein said ground clip includes at least one resilient tine in engagement with said positioning means.

12. An electrical connector as claimed in claim 11, wherein said positioning means is a conductive flange integral with said main body and having a width which is greater than a width of said main body measured in a direction perpendicular to an axis connecting said flange and said end of said main body.

13. An electrical connector as claimed in claim 1, wherein said positioning means is a conductive flange integral with said main body and having a width which is greater than a width of said main body measured in a direction perpendicular to an axis connecting said flange and said end of said main body.

* * * * *